United States Patent [19]

Atkinson et al.

[11] Patent Number: 4,694,484
[45] Date of Patent: Sep. 15, 1987

[54] CELLULAR RADIOTELEPHONE LAND STATION

[75] Inventors: Frederick G. Atkinson, Winfield; Anthony Kobrinetz, Hoffman Estates; Barry J. Menich, Chicago, all of Ill.

[73] Assignee: Motorola, Inc., Schaumburg, Ill.

[21] Appl. No.: 830,145

[22] Filed: Feb. 18, 1986

[51] Int. Cl.⁴ .............................................. H04Q 7/04
[52] U.S. Cl. ...................................... 379/59; 455/33; 455/349; 455/90; 379/58; 379/63
[58] Field of Search ....................... 379/60, 58, 56, 59, 379/63; 455/89, 90, 349, 33; 361/390, 391, 392, 393, 394, 395

[56] References Cited

U.S. PATENT DOCUMENTS

| | | |
|---|---|---|
| 2,602,842 | 7/1952 | Morris et al. . |
| 3,316,461 | 4/1967 | Henke et al. . |
| 3,663,762 | 5/1972 | Joel . |
| 3,819,872 | 6/1974 | Hamrick . |
| 3,860,872 | 1/1975 | Richardson et al. . |
| 3,906,166 | 9/1975 | Cooper et al. . |
| 4,101,836 | 7/1978 | Craig et al. . |
| 4,128,740 | 12/1978 | Graziano . |
| 4,144,411 | 3/1979 | Frenkiel . |
| 4,268,722 | 5/1981 | Little et al. . |
| 4,283,769 | 8/1981 | Hughes ............................ 455/349 |
| 4,369,520 | 1/1983 | Cerny, Jr. et al. . |
| 4,434,461 | 2/1984 | Puhl . |
| 4,475,010 | 10/1984 | Huensch et al. . |
| 4,479,246 | 10/1984 | Young . |
| 4,485,486 | 12/1984 | Webb et al. . |
| 4,491,966 | 1/1985 | Morcerf et al. . |
| 4,525,802 | 6/1985 | Hackamack ........................ 364/900 |
| 4,525,861 | 6/1985 | Freeburg . |
| 4,549,311 | 10/1985 | McLaughlin . |
| 4,598,336 | 7/1986 | Hehl ................................... 361/391 |

OTHER PUBLICATIONS

Fichaut et al., "New Services for the IRT 1500 Subscriber Connection System" *Commutation & Transmission,* No. 2, 1985, p. 25.

George G. Bradley, "Multichannel Radiotelephone for Inland Waterways", TeleTech, Jan. 1947.

N. Ehrlich, et al., "Cell Site Hardware", Bell System Technical Journal, vol. 58, No. 1, Jan. 1979.

Motorola, Inc., "Dyna T*A*C* TM System Description", Instruction Manual No. 68P81150E01-0, Mar. 15, 1983, pp. 14–24.

*Primary Examiner*—Robert Lev
*Attorney, Agent, or Firm*—Raymond A. Jenski; Rolland R. Hackbart

[57] ABSTRACT

A fixed site station for cellular systems is disclosed. A plurality of radio transceivers are removably disposed in apertures of the common equipment housing and are provided unique parameters of operation by the system controller dependent upon the aperture in which the transceiver is located and the antenna configuration of the cell being served.

19 Claims, 19 Drawing Figures

—PRIOR ART—

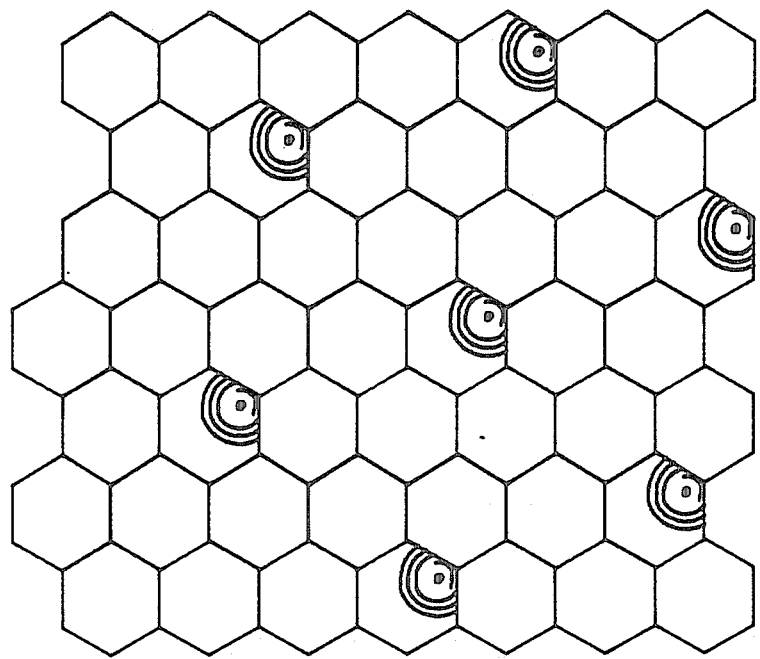
*Fig. 2* —PRIOR ART—
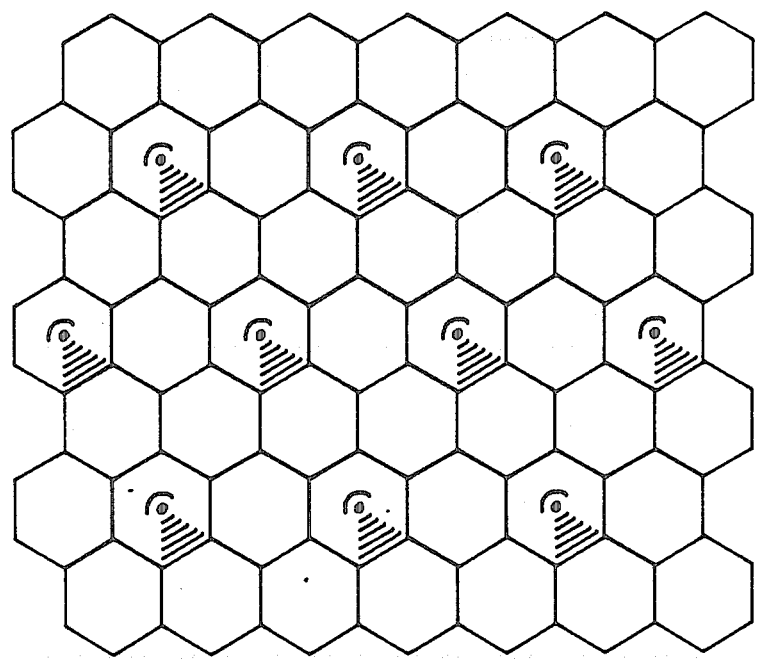
*Fig. 3* —PRIOR ART—

— PRIOR ART —

CELLULAR RADIOTELEPHONE LAND STATION

BACKGROUND OF THE INVENTION

Reference is made to three copending applications Ser. No. 830,166 filed 2/18/86, "Scanning Receiver Allocation Method and Apparatus for Cellular Radiotelephone Systems", by Menich et al.; Ser. No. 829,872 filed 2/18/86 "Method and Apparatus for Signal Strength Measurement and Antenna Selection in Cellular Radiotelephone Systems", by Menich et al.; Ser. No. 830,390 filed 2/18/86, "Interface Method and Apparatus for a Cellular System Site Controller", by Menich et al.) filed on the same date as the present application and containing related subject matter.

The present invention generally relates to the fixed equipment of radiotelephone communication systems and more specifically relates to improved apparatus and method employed in the radio reception, radio transmission, and control in the fixed equipment of a cellular radiotelephone system.

Mobile radiotelephone service has been in use for some time and traditionally has been characterized by a central site transmitting with high power to a limited number of mobile or portable units in a large geographic area. Mobile or portable transmissions, due to their lower transmission power, were generally received in transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166—Cooper et al.; 4,485,486—Webb et al.; and 4,549,311—McLaughlin, each assigned to the assignee of the present invention. The limited coverage area enables the channel frequencies used in one cell to be reused in another cell geographically separated according to a predetermined plan such as a seven cell repeating omnidirectionally illuminated cell pattern. In this pattern radio frequency energy is omnidirectionally transmitted from and received by a plurality of centrally located fixed stations and reuse of frequencies is accomplished in a pattern of cells such as that shown shaded in FIG. 1.

An alternative cellular pattern, FIG. 2, depicts a corner illuminated cell system in which 120° antennas are employed to illuminate the interior of a cell from three of the vertices of a hexagonal cell. (Although cell systems are conventionally shown as regular hexagonal patterns, such regularity is rarely achieved in practice).

Another pattern, FIG. 3, depicts a center illuminated cell system in which the cells are further subdivided into sectors. The sectors are illuminated by 60° antennas as illustrated in FIG. 3. A center illuminated sector cell system is further described in U.S. Pat. No. 4,128,740—Graziano and assigned to the assignee of the present invention. Thus, a large number can be made available in a metropolitan area and the service provided thereby can appear to be identical to a standard wire line telephone. A cell system typically utilizes one duplex frequency pair channel in each cell (a signalling channel) to receive requests for service from mobiles and portables, to call selected mobiles or portables, and to instruct the mobiles or portables to tune to another channel where a conversation may take place. This signalling channel is continuously assigned the task of receiving and transmitting data to control the actions of the mobile and portable radios. If the cell is sectorized as shown in FIG. 3, specialized receivers have been developed to enable the inputs from six 60° antennas to be combined for instantaneous reception over the sectorized cell coverage area. One such specialized receiver is described in U.S. Pat. No. 4,369,520—Cerny, Jr., et al., assigned to the assignee of the present invention.

Since the cells may be of relatively small size, the likelihood of a mobile or portable travelling between sectors or out of one cell and into another is high. The process of switching the established call from one sector or from one cell to another is known as handoff. Handoff also requires specialized receiving equipment such as a "scanning" receiver which can be instructed to tune to any of the channels in use in any of the sectors of the cell to measure the signal strength of each active mobile or portable. If the measured signal strength is below a predetermined level, cellular control equipment determines the availability of other channels in other sectors of the same cell or in neighboring cells and composes an instruction to the mobile or portable commanding it to tune to the new channel.

To accomplish the transmission and reception of conversation on duplex frequency voice channels, call set-up, and handoff, prior cellular radiotelephone fixed site equipment has been developed requiring a large amount of common equipment. This use of common equipment has in turn led to extensive interconnections between the various functional modules and in some instances has led to the partition of receiving, transmitting, and control functions into separate modules or racks of equipment. As a result of the aforementioned configurations, reliability of such equipment may be compromised and system growth and reconfiguration is complicated.

It is a further object of the present invention to define the operational parameters of the diversity receiver of the transceiver to be consistent with the antenna configuration of the cell in which the transceiver operates.

Accordingly, these and other objects are achieved in the present invention. This invention is an improved cellular radiotelephone fixed site station which includes a common equipment housing having a plurality of apertures in which a plurality of radio transceivers may be removably disposed. The apertures have an electrical connection to a fixed site station controller and an electrical interconnection with the transceivers which may have one of at least two electrical characteristics. The fixed site station controller programs each transceiver with operational parameters unique to each transceiver and dependent upon the electrical interconnection characteristic of the aperture into which the transceiver is disposed and other system requirements.

SUMMARY OF THE INVENTION

Therefore, it is an object of the present invention to increase the reliability of fixed site equipment by reducing the amount of hardware and number of electrical interconnections.

It is a further object of the present invention to enable the use of an essentially common fixed site transceiver as either a voice channel transceiver or a scanning receiver in a cellular system.

It is a further object of the present invention to enable the operational parameters of the transceiver to be automatically programmed to be consistent with the characteristics of the physical aperture of the common equipment housing into which the transceiver is placed.

BRIEF DESCRIPTION OF THE DRAWINGS

FIG. 2 is a representation of the geographic area covered by a conventional corner illuminated cell system.

FIG. 3 is a representation of the geographic area covered by a conventional center illuminated sector cell system.

DETAILED DESCRIPTION OF THE PREFERRED EMBODIMENT

Figure 1:
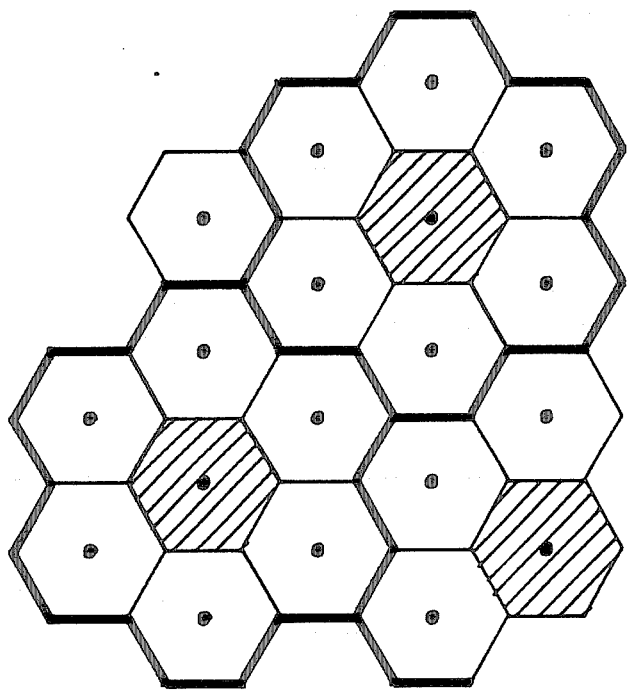
FIG. 1 is a representation of the geographic area covered by a conventional omnidirectionally illuminated cell system.
Figure 4:
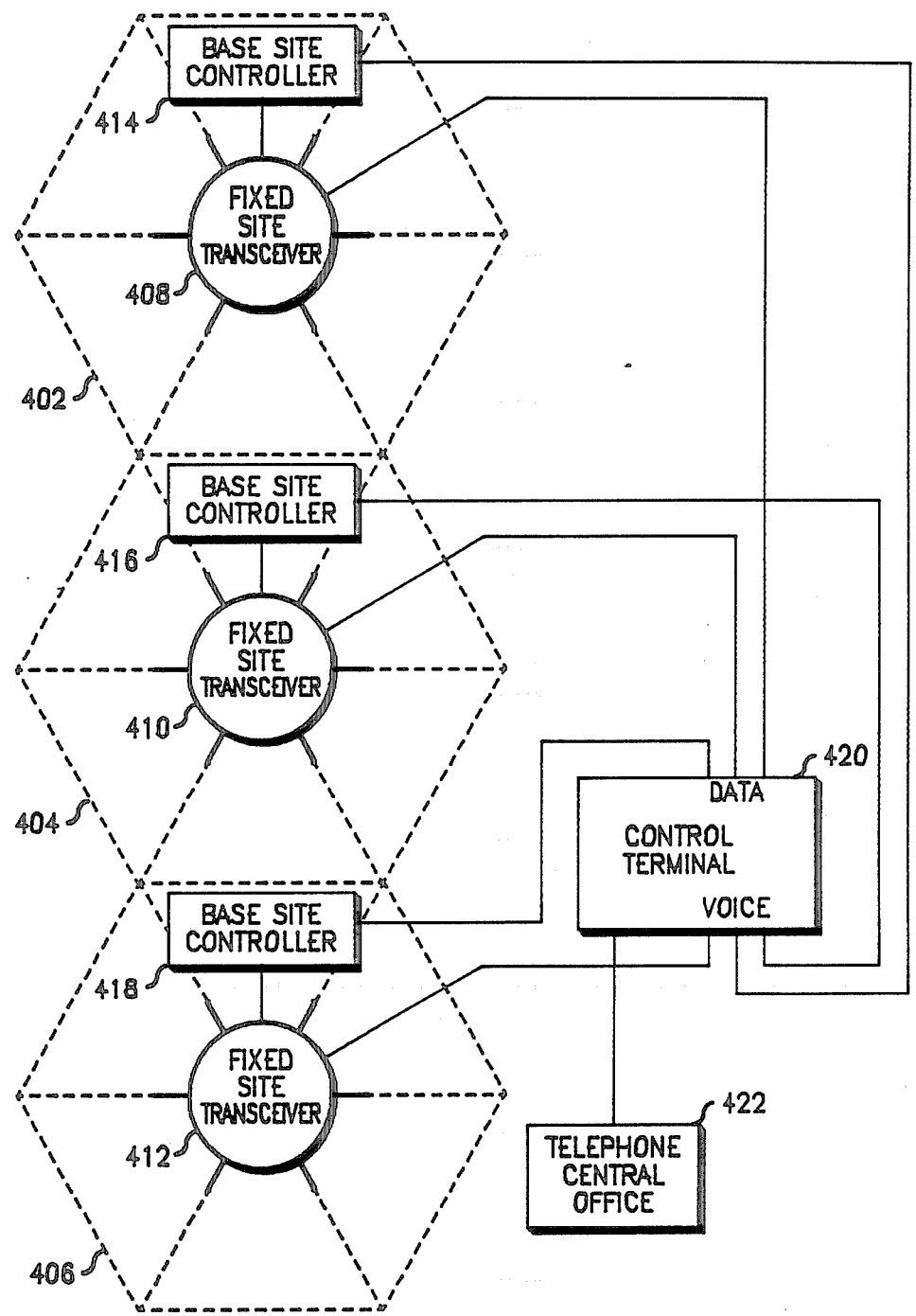
FIG. 4 is a basic block diagram of the relationships of the equipment which would be employed in a conventional center illuminated sector cell system.

Referring now to FIG. 4, there is illustrated a cellular radiotelephone communications system of the type which may particularly benefit from the invention herein described. The illustration of FIG. 4 shows three center illuminated sector cells of the type previously described in conjunction with FIG. 3 but with more detail regarding the type of equipment to be found in a sector cell system. Although the present invention will be described with particularity for the center illuminated sector cell system, it is obvious that a person skilled in the art may be able to apply the essence of the present invention to other types of cellular configurations such as those shown in FIG. 2 and FIG. 1.

As illustrated in FIG. 4, the geographical area is subdivided into cells 402, 404, and 406 which are illuminated with radio frequency energy from fixed site transceivers 408, 410, and 412, respectively. The fixed site transceivers are conventionally controlled by base site controllers 414, 416, and 418 as illustrated. These base site controllers are each coupled by data and voice links to a radiotelephone control terminal 420 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 420 is in turn coupled to the switched telephone network via a conventional telephone central office 422 for completing telephone calls between mobile and portable radiotelephones and landline telephones.

Figure 5:
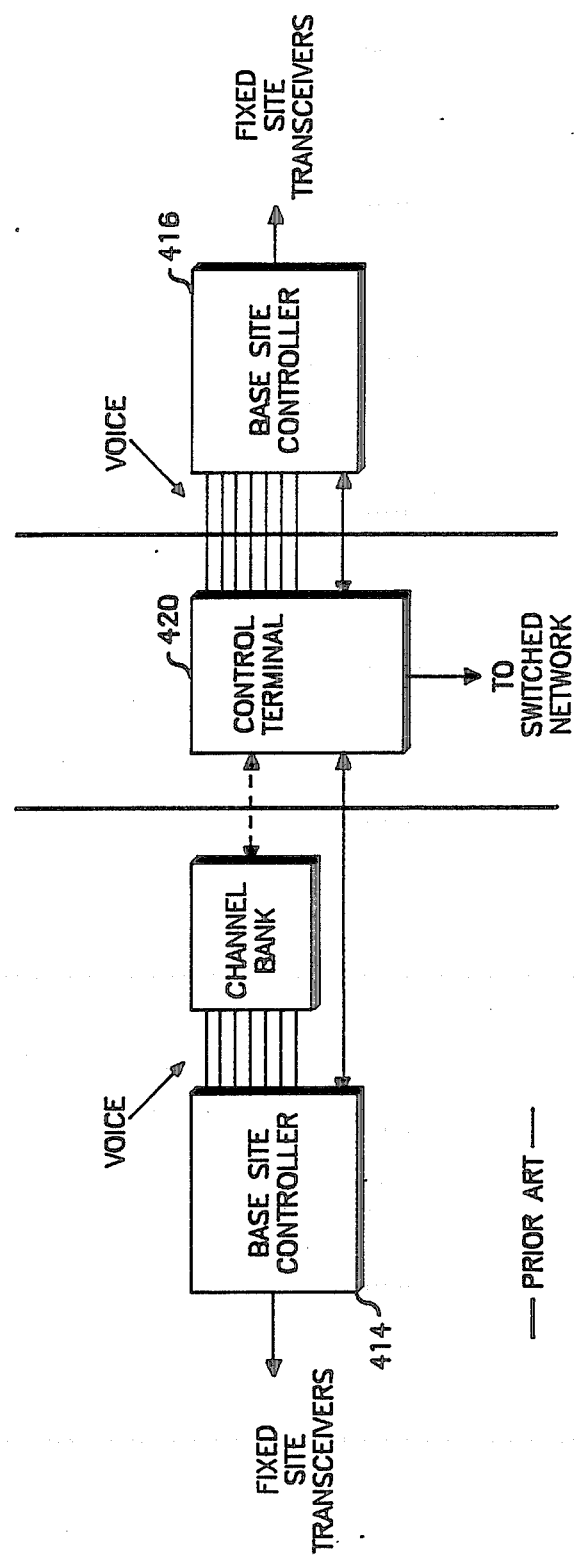
FIG. 5 is a block diagram of the interconnection between a control terminal and the base site controllers of a conventional cell system.

The interconnection between control terminal 420 and the base site controllers (BSCs) is further shown in FIG. 5. The per-channel interconnection may be on a line per channel basis such as shown between control terminal 420 and BSC 416 or the interconnection may be on a PCM group basis such as shown between control terminal 420 and BSC 414. Either type of interconnection is well known in the art. A separate data line (which may be a standard telephone line or other communications link capable of carring 4800 baud data) is extended between the control terminal 420 and each BSC under its control.

Each of the fixed site transceivers 408, 410, and 412 includes a plurality of transmitters and receivers for operating on at least one duplex signalling channel and a plurality of duplex voice channels. One conventional system employs transmitters and receivers of the type described in Motorola Instruction Manual No.68P810-60E30, published by Motorola Service Publications, Schaumburg, Ill., in 1982. Employing this equipment and spacing the channels in use at least 630 KHz from each other, enables the individual transmitters to be combined on a single antenna (which may be a 60° directional antenna) as illustrated in FIG. 6.

Figure 6:
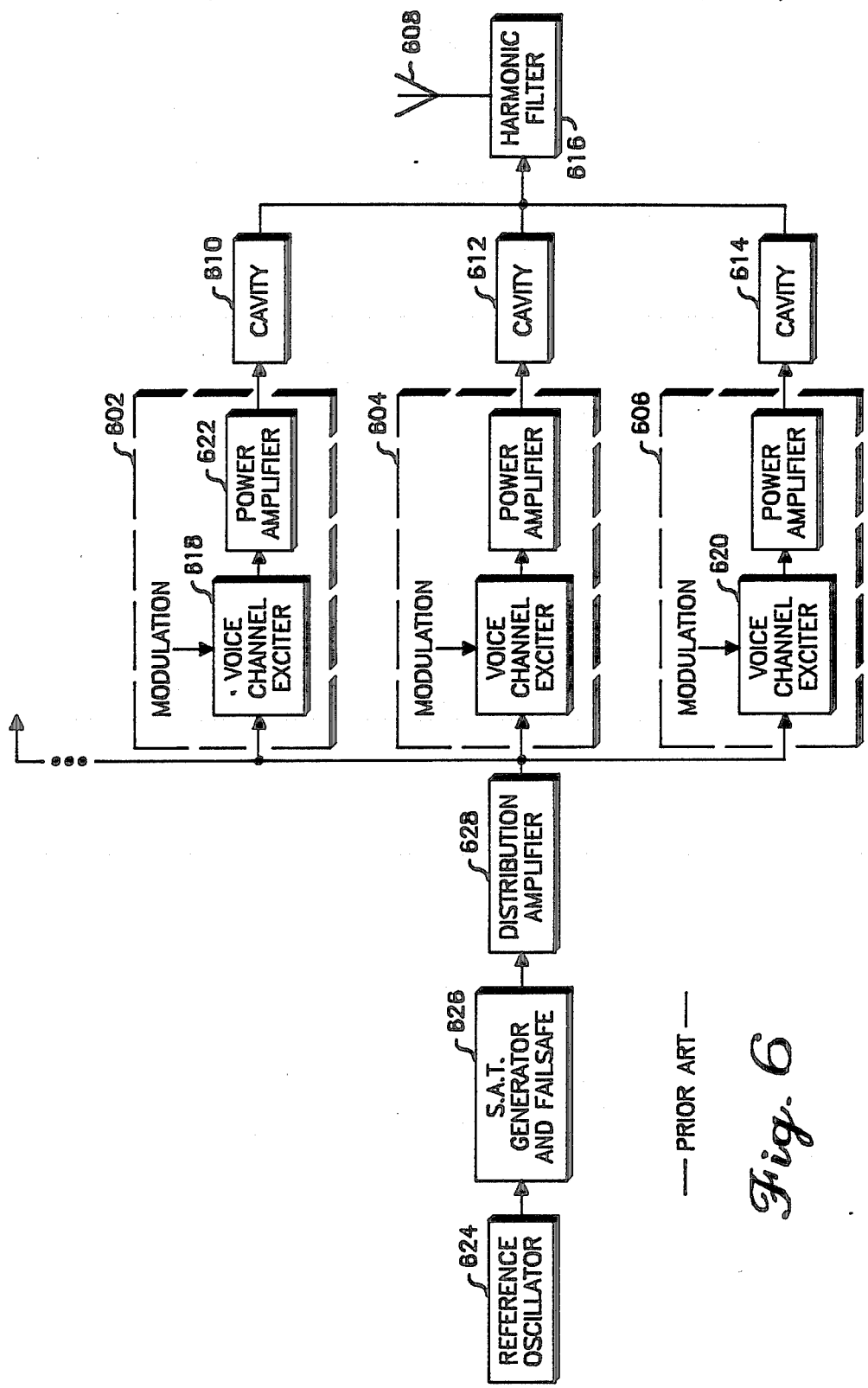
FIG. 6 is a block diagram of a conventional fixed site multichannel transmitter for a cell system.

In FIG. 6, three transmitters 602, 604, and 606 are shown connected to an antenna 608 via combining cavities 610, 612, and 614 and harmonic filter 616. Each transmitter consists of a voice channel exciter 618 for voice channels or a signalling channel exciter 620 for a signalling channel and a power amplifier 622. Each of the conventional transmitters shares a common reference oscillator 624, a supervisory audio tone (SAT) generator and failsafe circuit 626, and a distribution amplifier 628.

Figure 7:
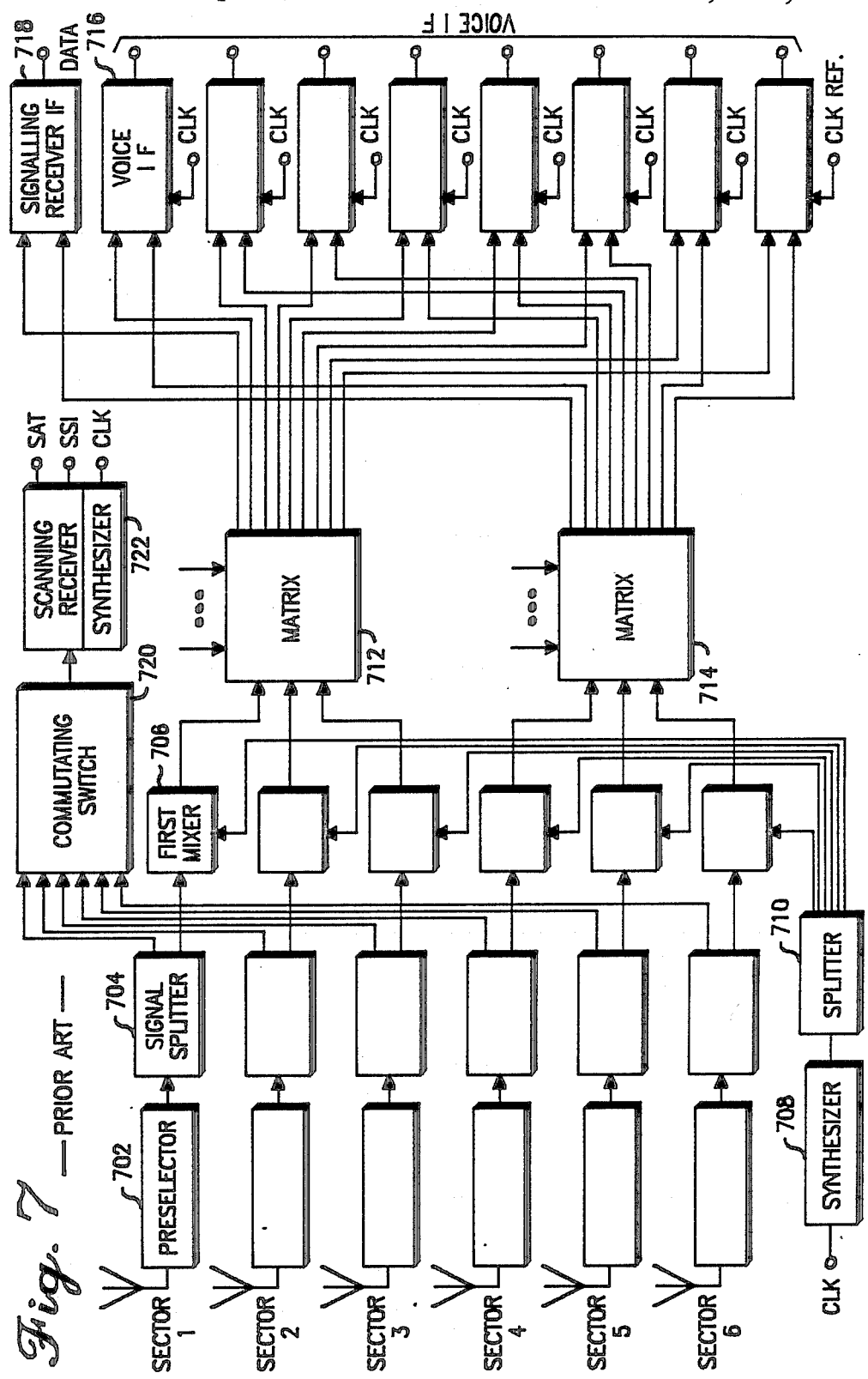
FIG. 7 is a block diagram of a conventional fixed site receiver system which may be employed in an omnidirectionally illuminated cell system.
Figure 8:
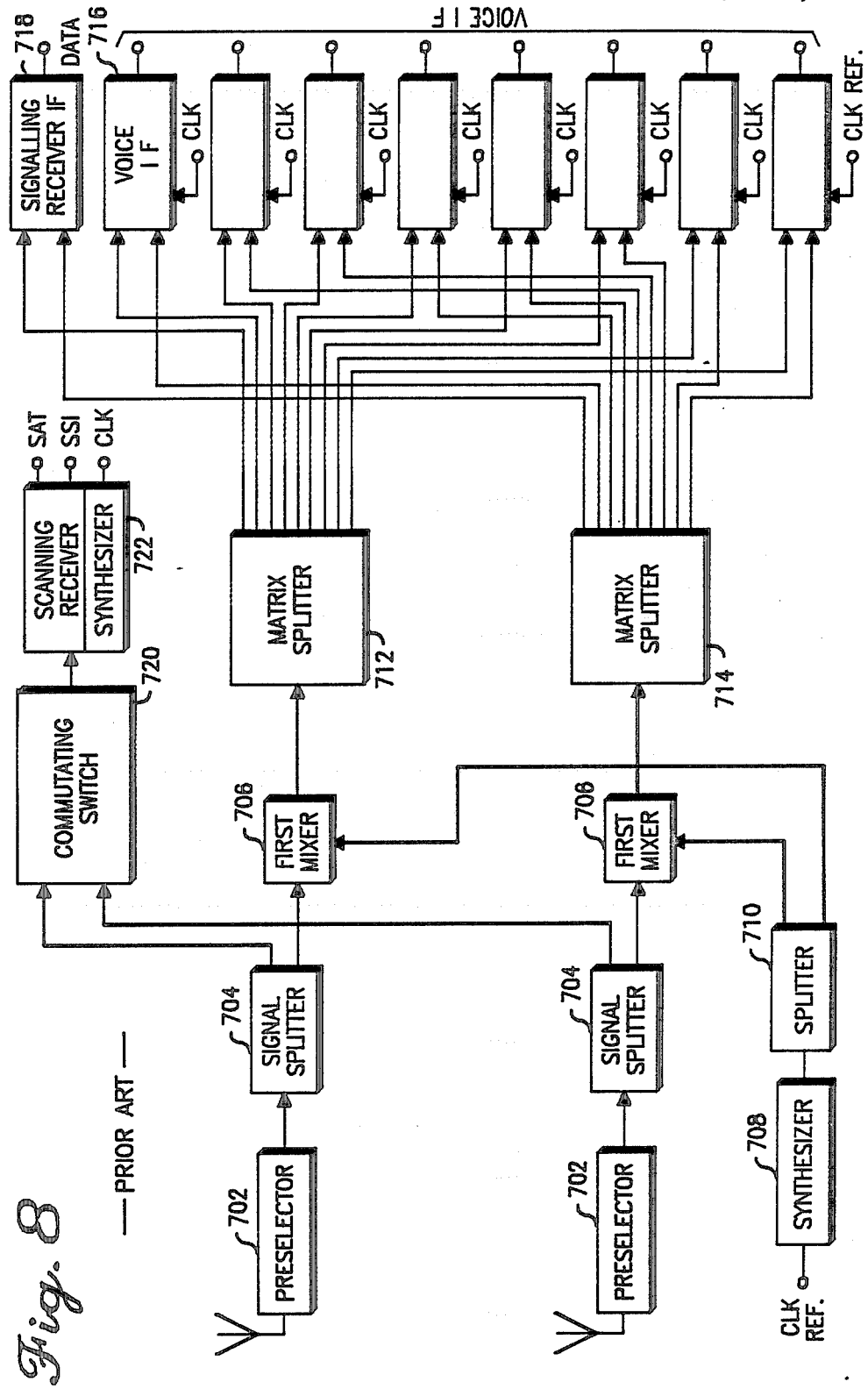
FIG. 8 is a block diagram of a conventional fixed site recerver system which may be employed in a center illuminated sector cell system.

The conventional receiving system is designed in modular groups of eight voice channel receivers, a signalling receiver, and a scanning receiver. Two possible system configurations are shown in FIGS. 7 and 8. Considering fi.rst the six sector receive system shown in FIG. 7, it can be seen that a set of broadband preselectors 702, signal splitters 704, and first mixers 706 convert each sector antenna input to an intermediate frequency (IF) for use by the remainder of the receivers. Local oscillator input to first mixers 706 is provided by a common synthesizer 708 and distributed to each of the first mixers 706 by splitter 710. Two switch matrices, matrix 712 and matrix 714 connect a pair of antennas corresponding to adjacent sectors to each of the voice receiver IFs 716 and the signalling receiver IF 718. A commutating RF switch 720 is connected to each of the signal splitters 704 and steps the scanning receiver 722 through each of the six sector antennas.

An omnidirectional receive system is shown in FIG. 8 and is a conventional subset of the sector receive system of FIG. 7. Two omnidirectional antennas encompass the entire 360° coverage area within the cell. The down converted signal from each of the antennas and output from first mixers 706 are split among each of the voice IF receivers 716 and the signalling receiver 718 by matrix splitters 812 and 814. Further, the scanning receiver 722 is toggled between the two antennas by commutating switch 820.

Figure 9:
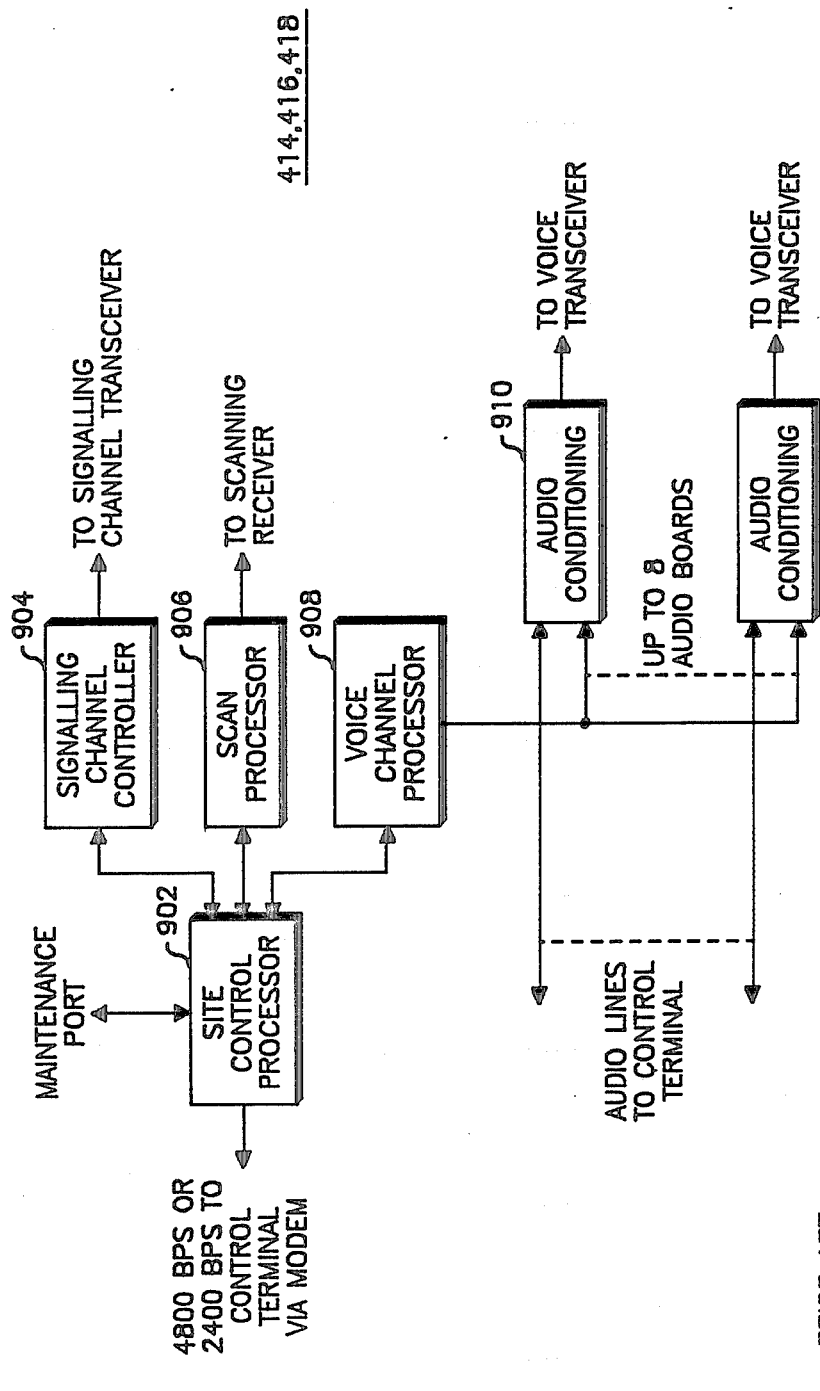
FIG. 9 is a block diagram of a conventional base site controller which may be employed in a cell system.

The conventional base site controller (414, 416, or 418) is shown in more detail in the block diagram of FIG. 9. The base site controller (BSC) provides two-way subscriber unit (mobile and portable) signalling, voice communications, and complete control and performance monitoring of the fixed site equipment. The BSC consists of a site control processor module 902 which controls all aspects of the base site operation. The site control processor 902 contains memory storage buffers for communication with the peripheral processors 904, 906 and 908. The site control processor 902 also contains serial interface ports for communicating with other site control processors and for communicating with the control terminal 420 and an RS-232 port for connection to a maintenance terminal. A signalling channel controller peripheral 904 sends paging and overhead messages to subscriber units via the signalling channel by command of the site control processor 902. The signalling channel controller 904 also decodes and corrects data received from subscriber units. In systems using sector receive antennas, it uses information from the signalling channel receiver 718 to make an initial estimate of the subscriber unit's location.

The scan processor peripheral 906 measures every active subscriber unit signal strength on each receive antenna. It also measures the supervisory audio tone frequency of subscriber units to verify that it is making measurements on the correct subscriber unit. The scan processor 906 is capable of directing the scanning receiver 722 to any subscriber frequency and measuring any of the three supervisory audio tone frequencies. The voice channel processor peripheral 908 controls up to eight voice channel IFs and the subscriber units using them. The voice channel processor 908 interfaces to each voice channel receiver through an audio conditioning board 910. The voice channel processor 908 sends messages to subscriber units by command of the site control processor 902 and further decodes and corrects data messages from subscriber units over the appropriate voice channel. The voice control processor 908 controls voice transmitters and voice channel receive antenna selection. The audio conditioning boards 910 are employed one for each voice channel in use at a fixed site. The audio conditioning boards 910 conditions and controls the audio for connection to both the receiver and transmitter radio equipment and the telephone lines to the control terminal 420.

Figure 10:
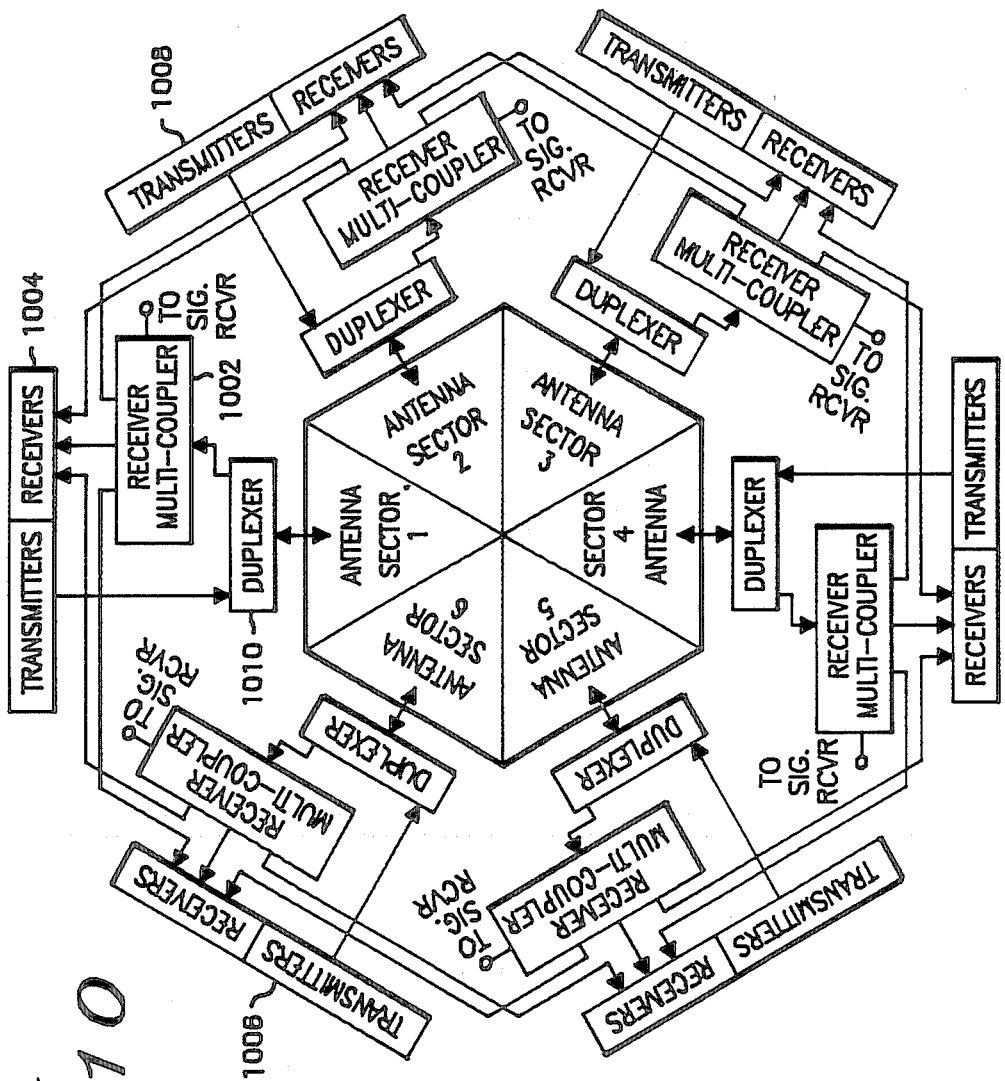
FIG. 10 is a block diagram of antenna interconnection in a center illuminated sector cell system which may advantageously utilize the present invention.

In order to reduce the amount of common equipment, provide for ease of expansion, and reduce the amount of intercabling and interconnection, the preferred embodiment of the novel invention of the present application utilizes the antenna system configuration shown in FIG. 10. The radio transceivers are connected to the sector antennas as shown. Especially note that each sector antenna is fed by a multicoupler (for example, RX multicoupler 1002) to the primary transceiver equipment dedicated to the particular sector (for example, transceivers 1004) and to bo th the adjacent sector transceiver equipment (for example, transceivers 1006 for sector 6 and transceivers 1008 for sectors 2). In addition, each sector antenna is coupled to a signalling receiver allowing the signalling receiver to have access to all six sector antennas. The transmitters of the primary transceiver equipment is coupled to the sector antenna via a duplexer (such as duplexer 1010). The duplexers may be similar to model ACD-2802-AAMO manufactured by Antenna Specialists Co., Cleveland Ohio.

Figure 11:
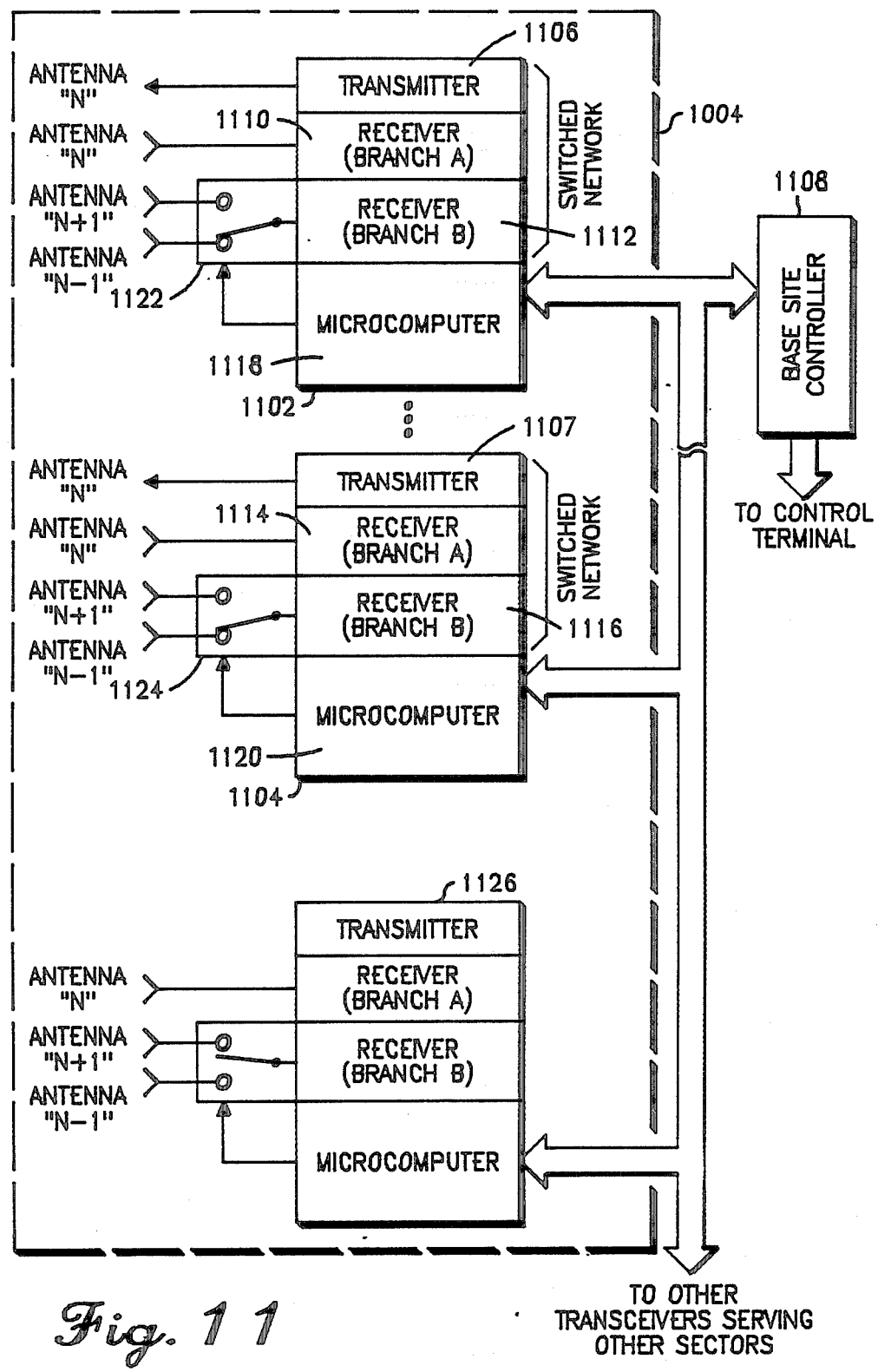
FIG. 11 is a block diagram of transceiver and base site controller interconnection in a cell system which may benefit from the present invention.

The interconnection of the fixed site transceivers to the antenna system and to the base site controller is shown in FIG. 11. In this configuration a transceiver (such as transceiver 1102 or transceiver 1104) consists of a transmitter 1106 and 1107 respectively, diversity receivers 1110 and 1112 (for transceiver 1102) and diversity receivers 1114 and 1116 for transceiver 1104. Each transceiver also comprises a microcomputer (1118 and 1120, respectively) and a sector switch (1122 and 1124, respectively). Additionally, an identical transceiver may be used as a scan receiver by employing the diversity receivers and the microcomputer as shown for transceiver 1126. (The transmitter for transceiver 1126 is not used).

Concentrating on the interconnections of transceiver 1102, it can be seen that transmitter 1106 and receiver (branch A) 1110 are coupled to the same primary antenna (via the duplexer 1010 and receiver multicoupler 1002 to antenna 1 as shown in FIG. 10). Receiver (branch B) 1112 is coupled to left and right adjacent sectors via sector switch 1122 (which from FIG. 10 are antenna 6 and antenna 2). The output bus from the BSC 1108 is connected to each of the microcomputers of the transceivers at a cell site. In the transceivers of the present invention, the transmitter 1106 input and receivers 1110 and 1112 output are connected directly to the switched network via the control terminal 420. Control of the interconnection to the control terminal 420 is achieved by microcomputer 1118 via control signals from the BSC 1108.

Figure 12:
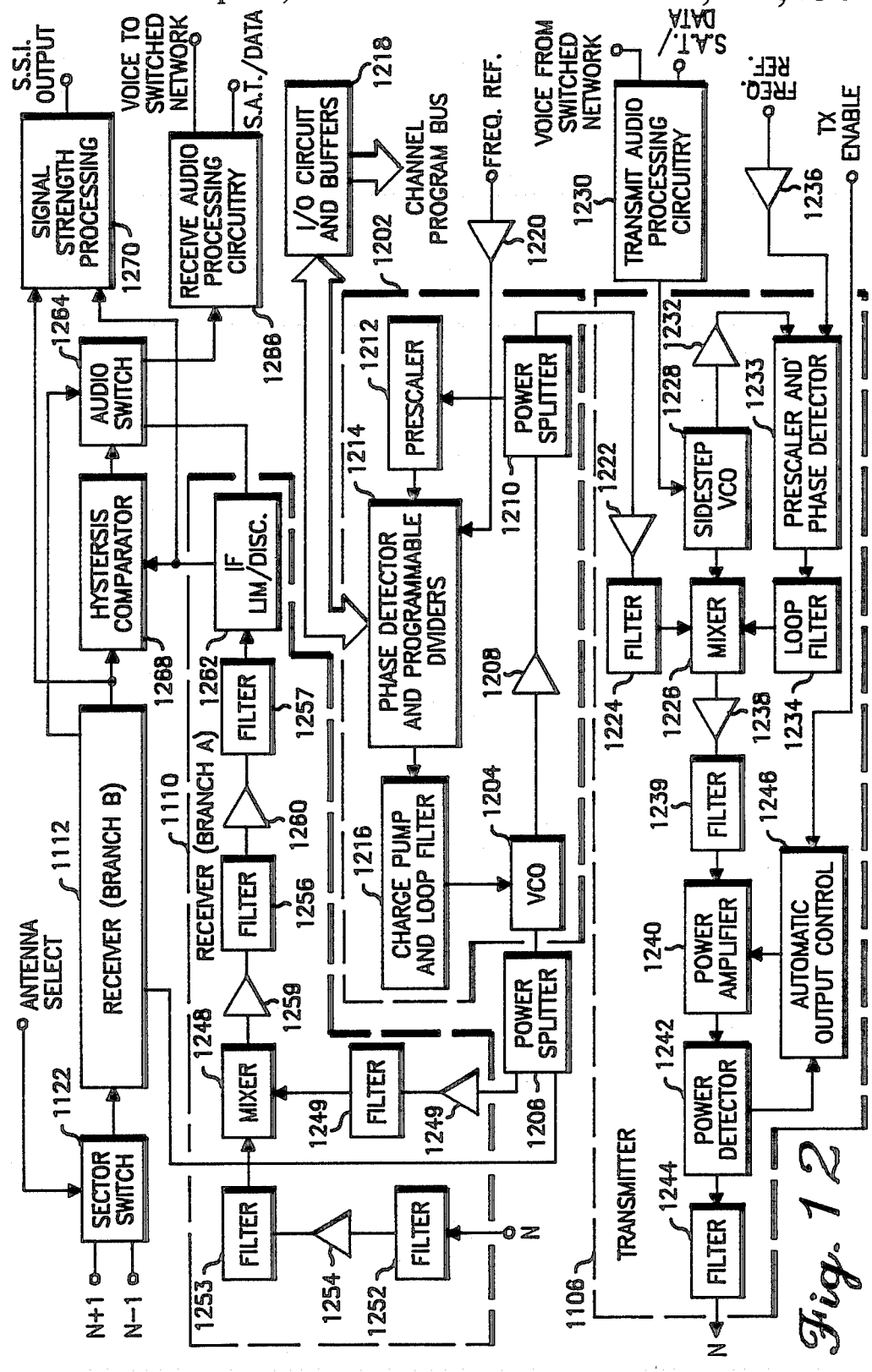
FIG. 12 is a detailed block diagram of the transceiver which may be employed in the system of the present invention.

A more detailed block diagram of the transceivers of the preferred embodiment is shown in FIG. 12. Transmitter 1106 and receivers 1110 and 1112 from transceiver 1102 are shown in detail. Each of the other transceivers including the scanning transceiver 1126 may have an identical design. In a preferred implementation of the present invention, a synthesizer 1202 having a conventional VCO 1204 provides the local oscillator signal for both receivers 1110 and 1112 via a power splitter 1206. The VCO 1204 also supplies a radio frequency signal to the transmitter 1106 via a buffer amplifier 1208 and power splitter 1210. A second output from power splitter 1210 is used as part of the conventional feedback of a frequency synthesizer and is routed through pre-scaler 1212 to the phase detector and programmable dividers 1214 which, in turn, provides a correction signal to the charge pump and loop filter 1216 to place and hold the VCO 1214 at the proper frequency. Frequency selection is conventionally made by selecting the proper division ratio of the programmable dividers 1214 via the channel program bus and I/O circuit and buffers 1218. The channel program bus is coupled to the transceiver microcomputer (such as microcomputer 1118) which selects the proper digital signals for the bus to place the transceiver on a designated channel. The ultimate stability of the synthesizer 1202 is determined by the frequency reference generated by an input to the phase detector and programmable dividers 1214 via buffer 1220. This reference is generated by a reference oscillator located in the common rack front end cabinet.

The transmitter 1106 accepts the synthesizer 1202 frequency output signal at buffer amplifier 1222 and filters the radio frequency signal by filter 1224 before applying the radio frequency signal to mixer 1226. A second signal applied to mixer 1226 is generated by the sidestep VCO 1228 and conventionally angle modulated by voice signals from the switched network and data and supervisory audio tone (SAT) which are input to the sidestep VCO 1228 via transmit audio processing circuitry 1230 (which may be similar to model TRN9732A, Audio/Control Board described in Motorola Instruction Manual No. 68P81071E17, published by Motorola Service Publications, Schaumburg, IL in 1985). The sidestep VCO 1228 is maintained at a frequency which is equal to or related to the spacing between the receiver and transmitter operating frequencies of the selected channel and the frequency chosen as the intermediate frequency of the receivers 1110 and 1112 by the conventional synthesizer control loop consisting of buffer amplifier 1232, prescaler and phase detector 1233, and loop filter 1234. Ultimate loop stability is controlled by the same frequency reference used for synthesizer 1202 via buffer amplifier 1236. (A similar method of sidestepping frequencies for duplex receivers and transmitters is further described in U.S. Pat. No. 3,825,830—O'Connor, assigned to the assignee of the present invention). The output signal from mixer 1226, which in the present invention is equal to the output frequency of the transmitter on this selected channel is coupled via buffer amplifier 1238 and filter 1239 to power amplifier 1240 where the transmitter signal is boosted in power to a useable transmission level. The output of the power amplifier 1240 is coupled through a power detector 1242 and a filter 1244 before being coupled to a duplexer (such as duplexer 1010) or to an external power amplifier which may further increase the transmitter signal power. The output from power detector 1242 is coupled to a conventional automatic output control circuit 1246 which fixes the level of the output of power amplifier 1240 at a constant level.

The receiver local oscillator signal is coupled from the power splitter 1206 to the mixer 1248 of receiver (branch A) 1110 via buffer amplifier 1249 and filter 1250. (Identical circuit configuration exists for receiver (branch B) 1112 and an identical description for receiver (branch B) 1112 is omitted here for brevity). A received signal from the primary antenna is input to the mixer 1248 via filters 1252 and 1253 and radio frequency preamp 1254. The intermediate frequency (IF) product of the two signals input to mixer 1248 is selected by filters 1256 and 1257 and amplified by IF amplifiers 1259 and 1260 before being applied to an IF limiter/discriminator circuit 1262. Two outputs are provided from the I/F limiter/discriminator 1262, the first of which is the demodulated audio signal which is passed through audio switch 1264 and receive audio processing circuitry 1266 (which may also be similar to a model TRN9732A Audio/Control Board) where the voice signal is coupled to the switched network, and the data is coupled to the BSC, and the supervisory audio tone (SAT) is detected by comparison to a locally generated tone and the detection is supplied to a microprocessor of the transceiver microcomputer 1118. A second output from the IF limiter discriminator 1262 is a signal which corresponds to the signal strength of the received signal from the antenna and is known as the receive signal strength indicator (RSSI). The RSSI signal is coupled to a hysteresis comparator 1268 (an MC3302 or equivalent in the preferred embodiment) which compares the RSSI signal from receiver (branch A) 1110 and receiver (branch B) 1112. The result of the comparison causes the audio switch 1264 to pick the demodulated audio signal from either receiver 1110 or receiver 1112 depending upon which RSSI signal indicates a stronger received signal and allows that demodulated audio to be coupled to the received audio processing circuitry 1266. In one implementation of the preferred embodiment, further processing of the RSSI signal is accomplished in a signal strength processing circuit 1270 and output to the transceiver microcomputer 1118 for use by the BSC 1108 and control terminal 420. Such a receiver having the signal strength processing circuit 1270 may be used as a scanning receiver 1126.

Figure 13:
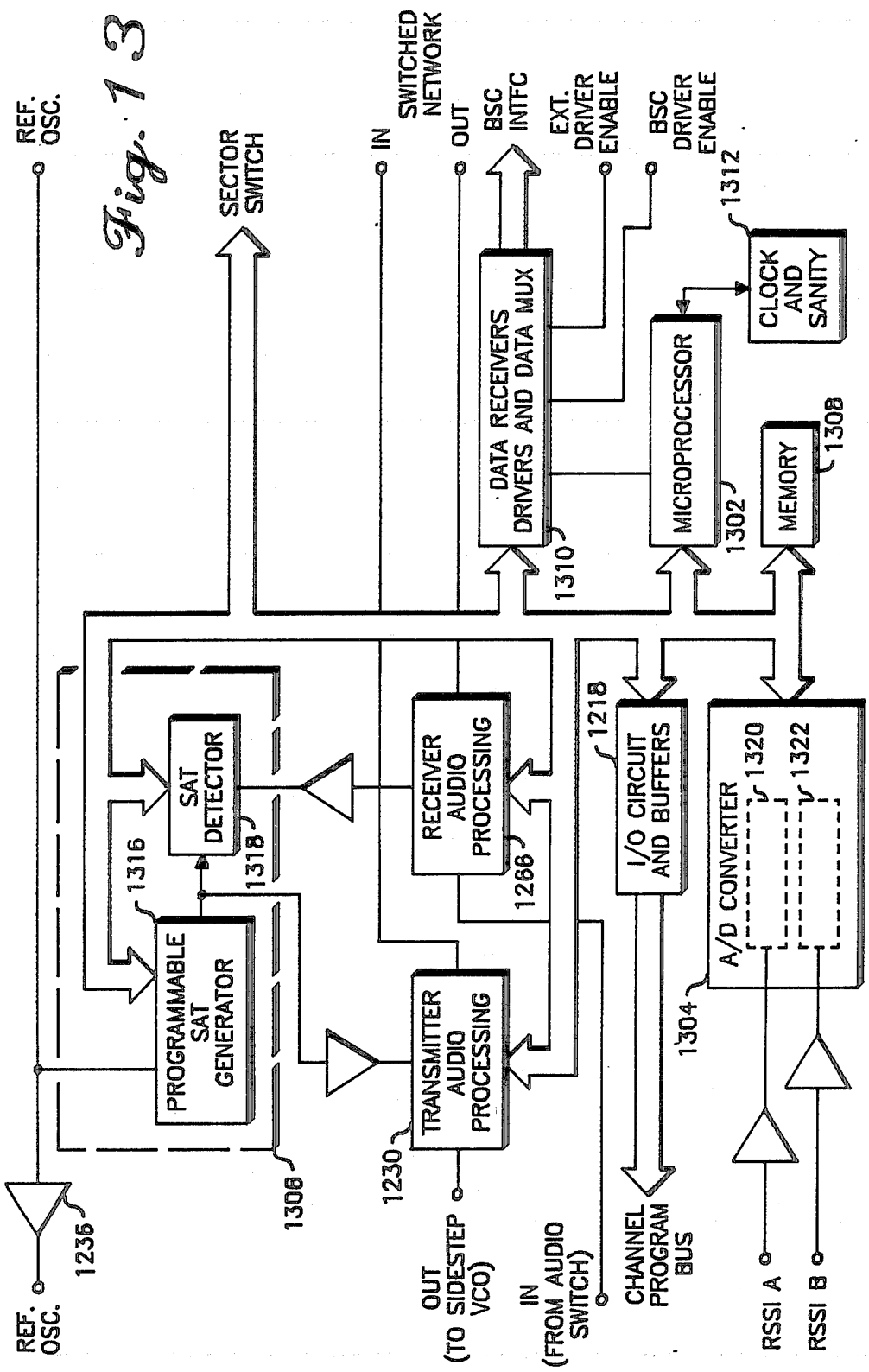
FIG. 13 is a block diagram of the microcomputer which may be employed in the transceiver of FIG. 12.

Referring to FIG. 13, it will be seen that the microcomputer 1118 and 1120 of the transceivers consists of a microprocessor 1302 (which may be an MC1468705G2 microprocessor available from Motorola, Inc. or equivalent) which is used to control the other submodules of the transceiver. The microcomputer 1118 has major peripherals an A/D converter 1304, a supervisory audio tone (SAT) generator 1306, conventional RAM and ROM memory 1308, conventional data receivers, drivers and data mux (for selecting sources and destinations of land/radio data) 1310, and microprocessor clock and sanity timing device 1312. Control data and information is coupled between the microprocessor 1302 and the base site controller (BSC) via the data receivers/drivers 1310 which may have additional enable ports for external control. The analog to digital (A/D) converter 1304 for the received signal strength may be realized by a multiplexing A/D converter such as an MC145041 available from Motorola, Inc. or equivalent. Conceptually, a dual channel A/D converter 1304 can be considered individual A/D channel 1320 for receiver (branch A) and A/D channel 1322 for receiver (branch B). The digitized received signal strength is made available to microprocessor 1302 as needed.

The supervisory audio tone (SAT) detector 1306 is realized in the preferred embodiment by generating a selected SAT frequency in a programmable SAT generator 1316 (which may conventionally be realized using a phase locked loop such as an MC14046 available form Motorola, Inc. and standard programmable BCD/binary counters such as MC14569 available from Motorola, Inc.). The SAT output may then be coupled to a SAT detector circuit 1318 which may be a conventional frequency comparison network. The detection may then be coupled to the microprocessor 1302.

Because the transceiver of the preferred embodiment is equipped with a programmable frequency synthesizer 1202 for both receiver and transmitter (programmed by microprocessor 1302 via I/O circuit and buffers 1218), an A/D converter 1304, and a SAT generator 1306, the transceiver may be used interchangeably as a scan receiver, as a voice channel transceiver, or a signalling channel receiver. This fact allows the BSC 1108 to be relieved of the task of making and controlling the process of signal strength measurement and SAT detection thereby making possible the use of available voice channel transceivers as scanning receivers when a handoff measurement request is received from the control terminal 420. The transceiver takes cell site characteristics that are downloaded from the vice channel controller of BSC 1108 via the transceiver interface communications link. The downloaded information is the cell type in which the transceiver is being operated (Omni, Sector) and what kind of function the transceiver is to perform in the system: voice channel transceiver, scanning receiver, or signalling transceiver. Also, the transceiver used for scanning is capable of queueing several handoff measurement requests, executing them, and queueing the results.

Handoff measurement requests that come to a transceiver via the VCC are queued automatically and are run as soon as possible. The only reason that a handoff measurement request would not run immediately is that it would have to wait for a current request to finish execution. Included within the handoff measurement request are the channel frequency synthesizer 1202 programming and the SAT generator 1316 programming.

When a handoff request comes to a selected transceiver, a flag is set that alerts the SSI measurement software to the fact that there is a measurement request that is waiting execution in the queue. When the measurement request software task runs, it pulls the request out of the queue, programs the SAT generator 1316, programs the frequency synthesizer 1202, and then beings taking measurements. A method and apparatus for measuring signal strength on receive antennas is further described in U.S. Pat. No. 4,485,486—Webb et al., assigned to the assignee of the present invention.

Results of the handoff measurement requests are queued in the RAM memory 1308 of the transceiver microcomputer and await an opportunity to be sent uplink to the VCC. That opportunity comes when the VCC polls the tranceiver for its status. Since handoff measurement responses have priority over all other outbound messages from the transceiver, the response will go uplink as soon as possible.

Figure 14:
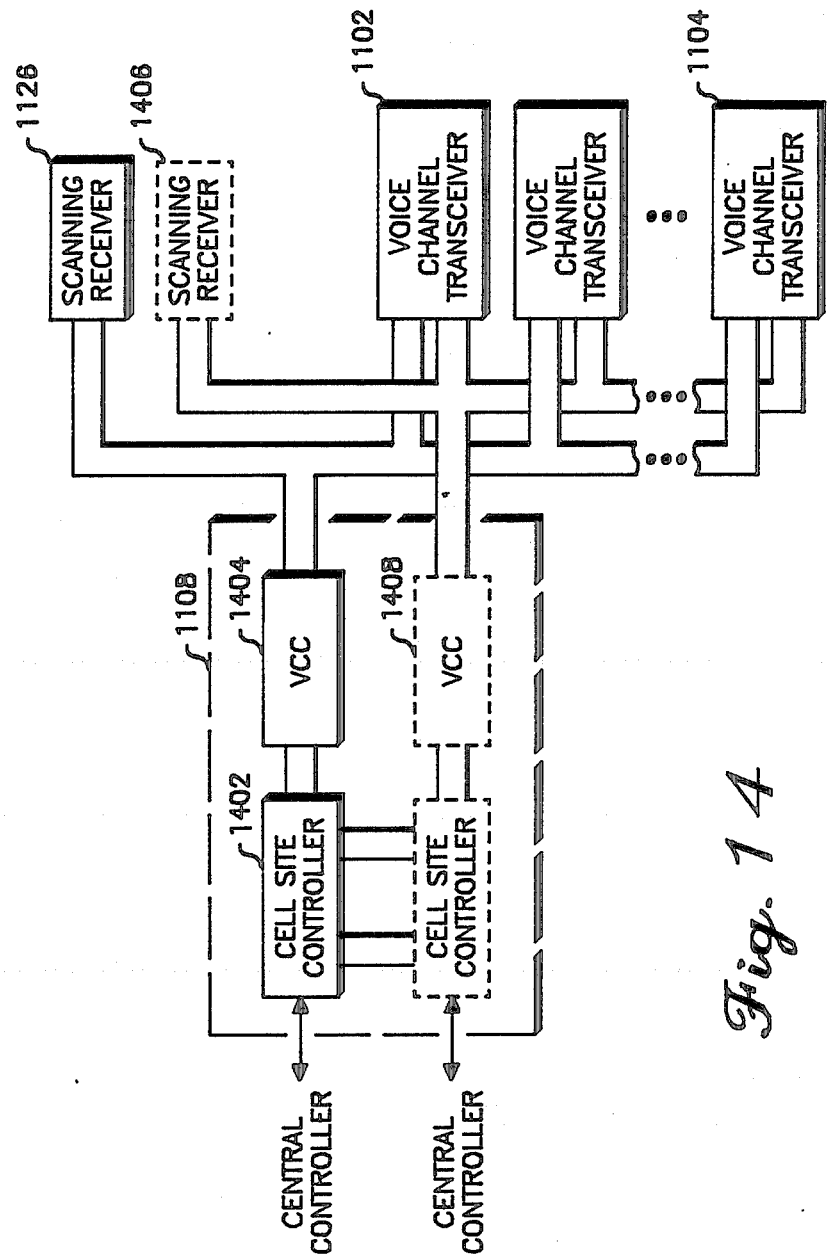
FIG. 14 is a block diagram of the base site controller of the present invention illustrating redundancy.

FIG. 14 illustrates the basic block diagram of the BSC 1108 and its interconnection to the transceivers. The cell site controller (CSC) 1402 is the highest level function and coordinates all of the activities at the cell site as well as providing the interface between the cell site and the telephone central office 422 (mediated by the control terminal 420).

Figure 15:
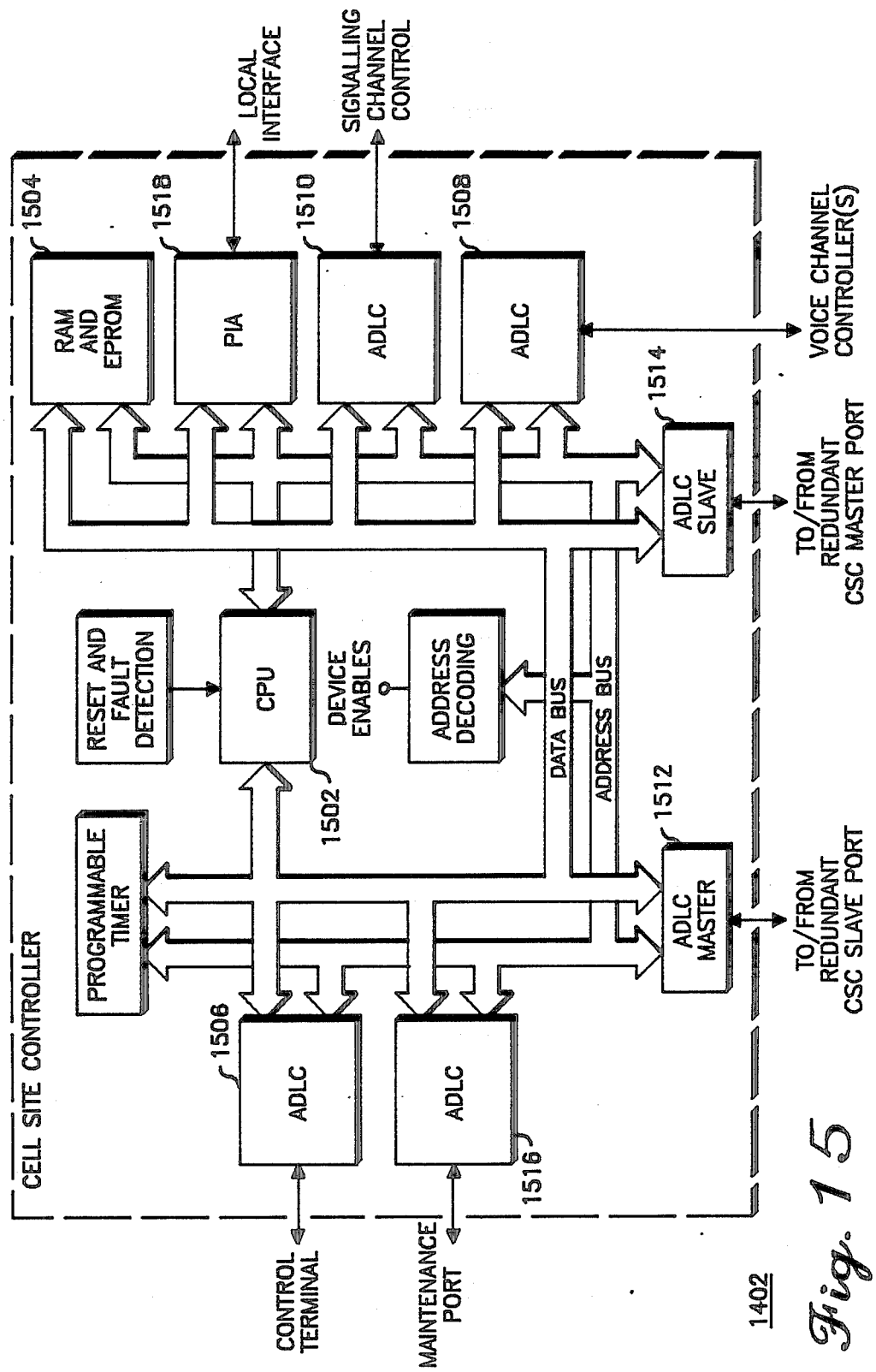
FIG. 15 is a detailed block diagram of a cell site controller (CSC) such as that which may be employed in the base site controller of FIG. 14.

A more detailed block diagram of the cell site controller (CSC) is shown in FIG. 15. A microprocessor such as an MC6802 available from Motorola, Inc., is employed as a central processing unit (CPU) 1502 which coordinates all of the activities at the cell site in accordance with an operating program stored in RAM and EPROM 1504. Six data ports are used to exchange control and status messages with the control terminal 420 (via ADLC 1506), one or more voice channel controllers (VCC's) (via ADLC 1508), signalling channel receiver control (via ADLC 1510), redundant (slave) CSC and/or redundant (master) CSC (via ADLC 1512 and 1514 respectively), and a maintenance port (via ACIA 1516). All of the aforementioned serial ports in the preferred embodiment, except for the maintenance port, are bit-oriented synchronous serial data links using a version of the Advanced Data Communications Control Procedures (ADCCP) as the communications protocol. The maintenance port, used for maintenance and software loading, supports a standard asynchronous serial protocol. Additionally, a peripheral interface adapter (PIA 1518) supports auxiliary input/output which may be used as a local customer interface.

A voice channel controller (VCC) 1404 may control up to 30 voice transceivers and one scanning receiver in the preferred embodiment. A redundant VCC 1408 may be employed to provide system redundancy down to the voice channel transceiver and double the transceiver capacity. This is possible because each transceiver has two communications ports with which to communicate with two VCCs. The communications ports on the transceivers are embodied within the transceiver microcomputer itself. A signal called "XCVREN" (transceiver enable) is sued by the VCC to select the port on the transceiver that will be used for communications. One VCC will control one port and a redundant "partner" VCC will control the other port. The transceiver communicates with that VCC which is currently asserting the transceiver signal. Thus it is possible for the second VCC to continue controlling a voice transceiver should the first VCC fail. It is even possible to reconstruct call activity as the call processing and maintenance state of the voice transceiver is continuously being updated.

If the maintenance state of the channel is "in service", the call processing state can be taken from the transceiver and reconstruct the call. The call processing and maintenance states of a particular channel are stored within the transceiver by sending these states periodically in certain messages that are used to control the transceiver by the controlling VCC. When another VCC (the partner) takes control of the channel, it queries the transceiver as to its call and maintenance states. The maintenance state is used to update a list and the call state is used to reconstruct the SAT detection algorithm in the VCC. From the call state it can be determined whether to be looking for positive or negative SAT detection on the channel. This corresponds to the channel being in a conversation state, a connect state, or a disconnect state.

Figure 16:
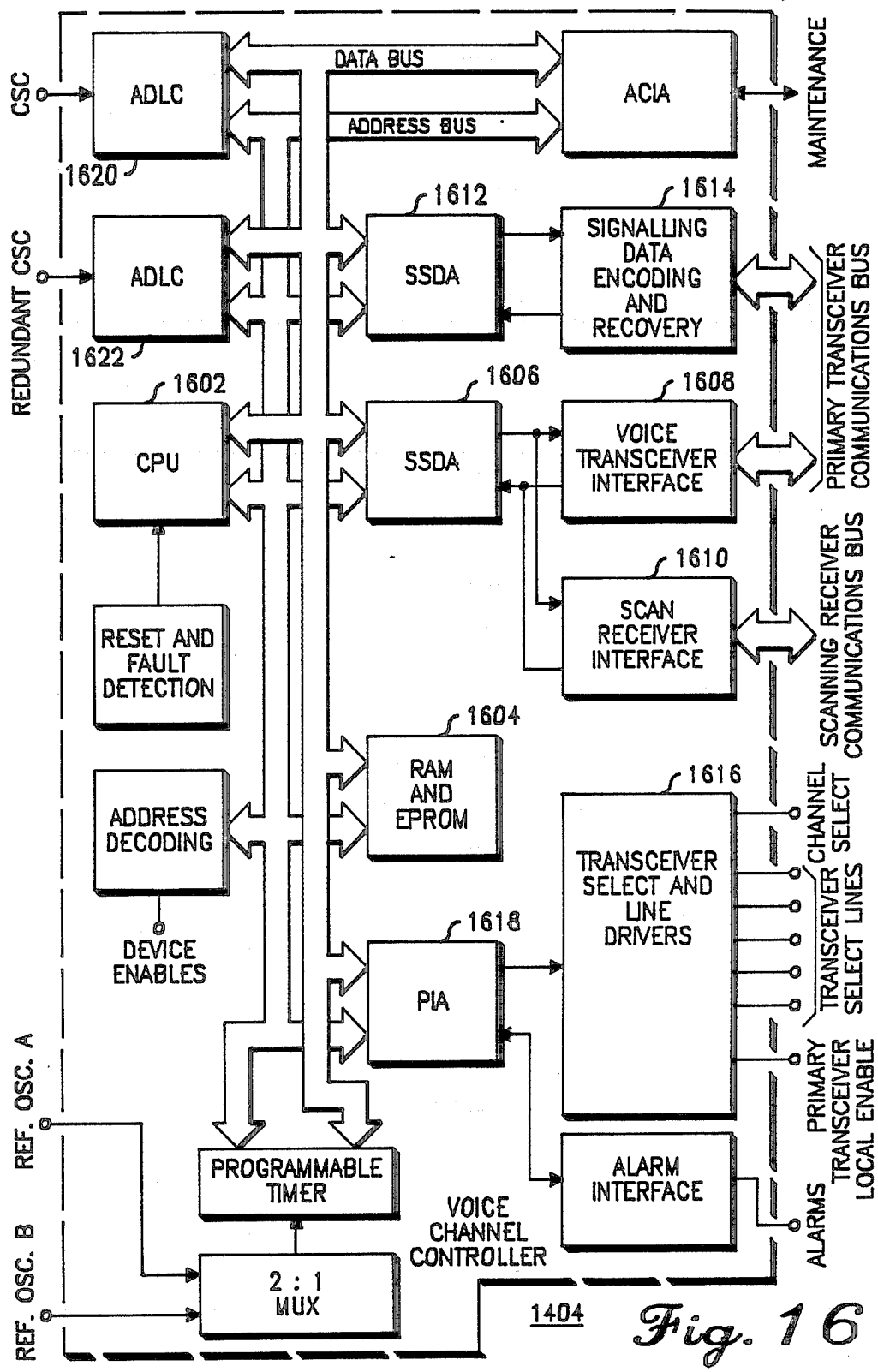
FIG. 16 is a detailed block diagram of a voice channel controller (VCC) such as that which may be employed in the base site controller of FIG. 14.

A detailed block diagram of a voice channel controller (such as VCC 1404) which may be employed in the present invention is shown in FIG. 16. The central processing unit (CPU 1602) may be a microprocessor such as MC6809 available from Motorola, Inc. This CPU 1602 is used to control the cell site voice channel transceivers and scanning receiver(s) in accordance with programmed steps stored in RAM and EPROM 1604. In a nonredundant configuration of the present invention, VCC 1404 may control up to 30 channels of radio equipment and one scanning receiver employing SSDA 1606, voice channel transceiver interface 1608, and scanning receiver interface 1610. Signalling data encoding and decoding is controlled via SSDA 1612 and signalling encoding and recovery interface 1614. Transceivers are selected by select logic and line driver circuit 1616 which is controlled by CPU 1602 via peripheral interface adaptors (PIA 1618). In the redundant configuration requiring two VCCs, each transceiver (being dual-ported) can communicate with both VCCs. Under normal operating conditions, each VCC actively controls half of the channels while exchanging control and status messages with the other half. Interface with the master CSC (if present) via ADLC 1622.

Figure 17:
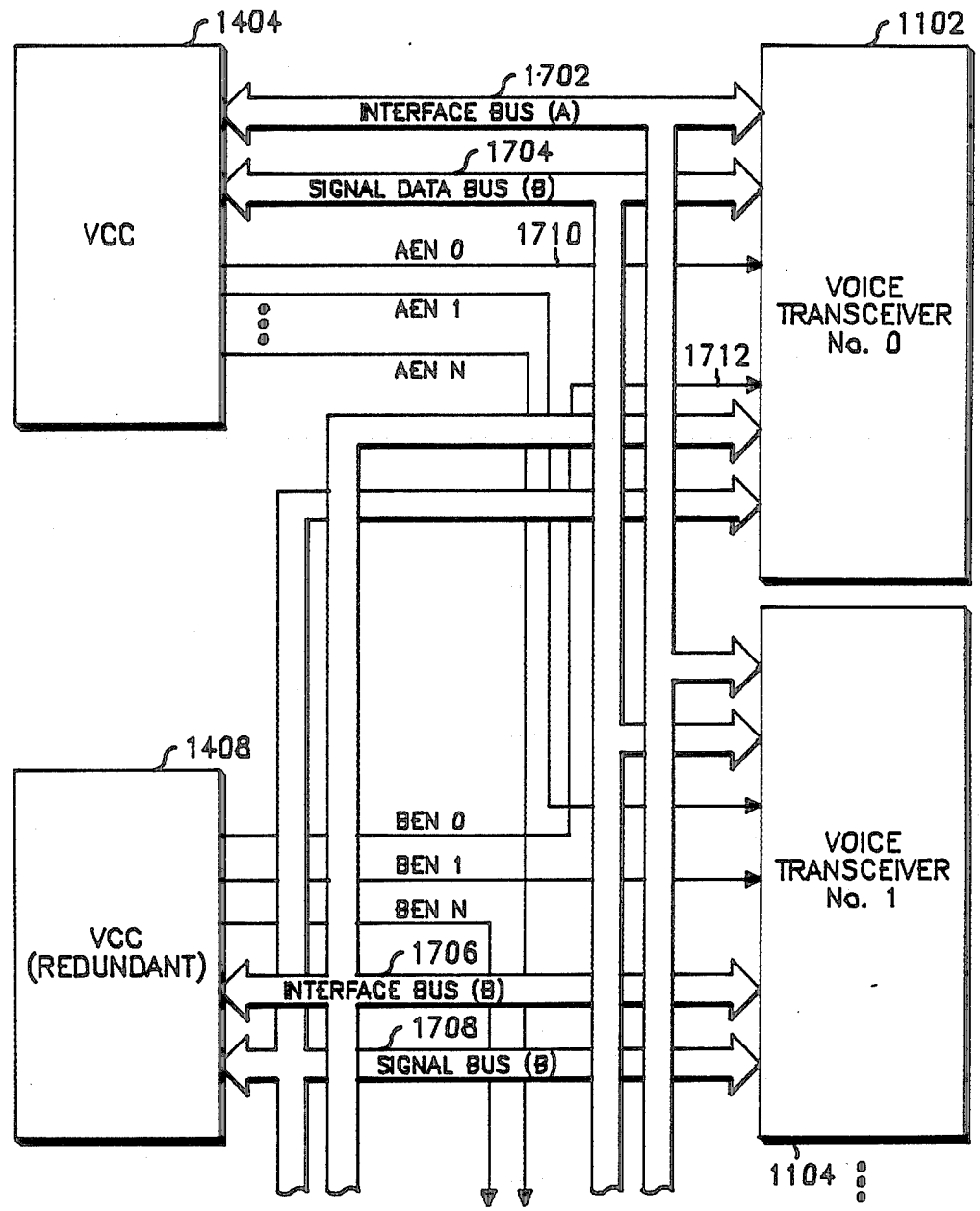
FIG. 17 is a block diagram of the bus structure between the VCC and the transceivers of the present invention.

Considering now the interface between VCC 1404, VCC 1408, and two of a possible many voice transceivers-transceiver 1102 and transceiver 1104, it can be seen from FIG. 17 that the bus between a VCC and a voice transceiver may consist of two 8-bit parallel busses: an interface bus 1702 and a signalling data bus 1704. A redundant pair of busses (interface bus 1706 and signalling data bus 1708) couple the redundant VCC 1408 to each of the voice channel transceivers. Each voice transceiver is coupled by an independent enable line to the primary VCC 1404 and the redundant VCC 1408. (For example, voice transceiver 1102 is coupled to VCC 1404 via enable line AEN0 1710. Likewise, voice transceiver 1102 is coupled to redundant VCC 1408 via enable line BEN0 1712. Each other voice channel transceiver is coupled to both VCCs in a similar manner).

Figure 18:
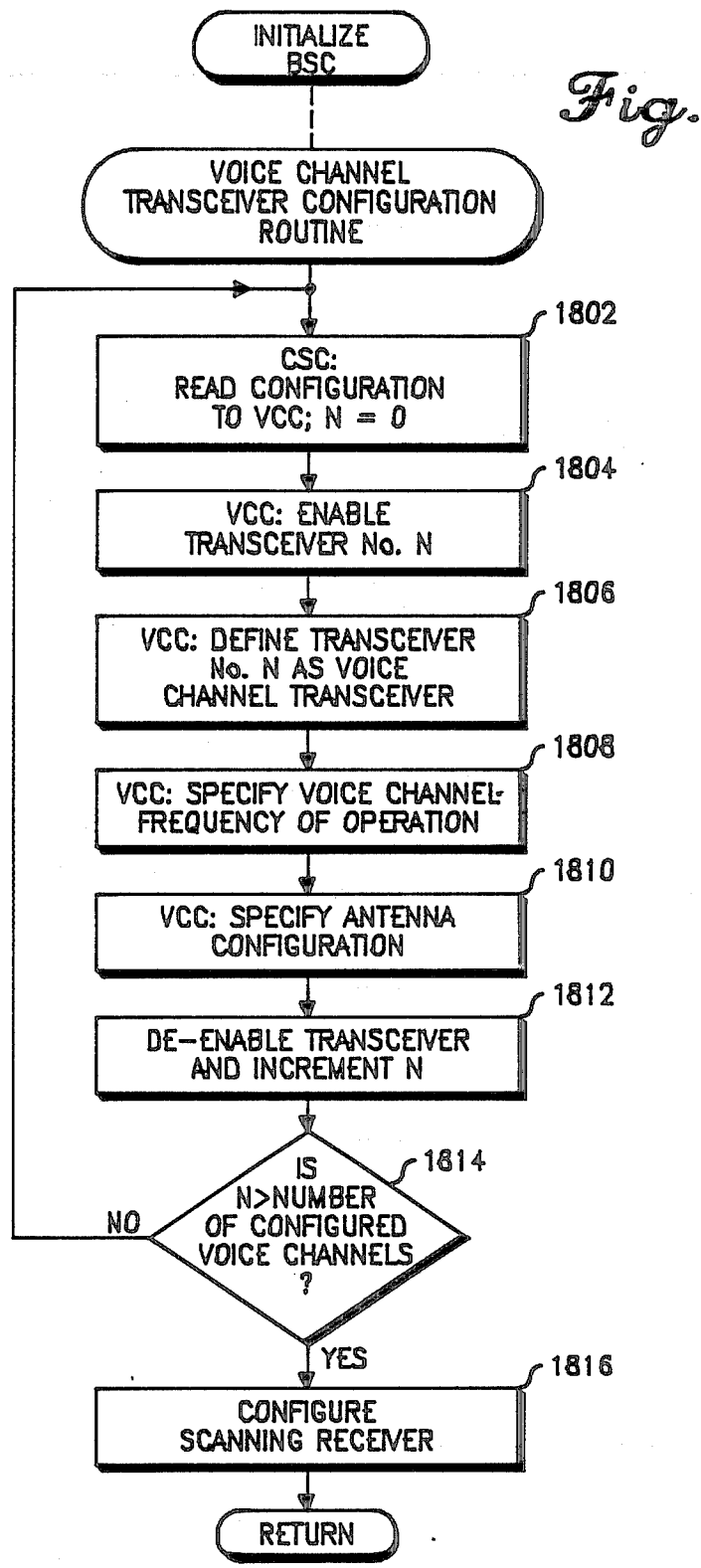
FIG. 18 is a flowchart of the transceiver configuration process employed in the present invention.

Since each transceiver may be employed as a voice channel transceiver, a scanning receiver, or a signalling channel transceiver, each transceiver must be instructed regarding the role it is to play in the cellular fixed site arrangement. The process of so instructing is shown in the flowchart of FIG. 18. When the base site controller (BSC) is initialized for the first time or after a reconfiguration, the initialization sequence enters a subroutine which configures the voice channel transceivers to meet the requirements programmed into the BSC. As a first step in the preferred embodiment, the cell site controller (CSC) reads the stored voice channel transceiver configuration (at 1802) to the VCC which is responsible for those transceivers being configured. (As previously described, each VCC may control up to 30 voice channel transceivers). Each transceiver is enabled in turn (at 1804) via its particular enable line, thereby making the transceiver microcomputer receptive to a message from the primary VCC. The VCC then transmits a three byte message to the enabled transceiver (at 1806) defining the transceiver as a voice channel transceiver. Additional messages may communicate the frequency of operation (at 1808), the particular antenna configuration for the cell (at 1810), and other system parameters (not shown). The transceiver is then de-enabled and the transceiver number is incremented by one at 1812. A test 1814 is performed to determine whether all of the transceivers have been configured and if they have, the VCC proceeds to provide configuration parameters to the dedicated scanning receiver (at 1816) via the scanning receiver communications bus.

Figure 19:
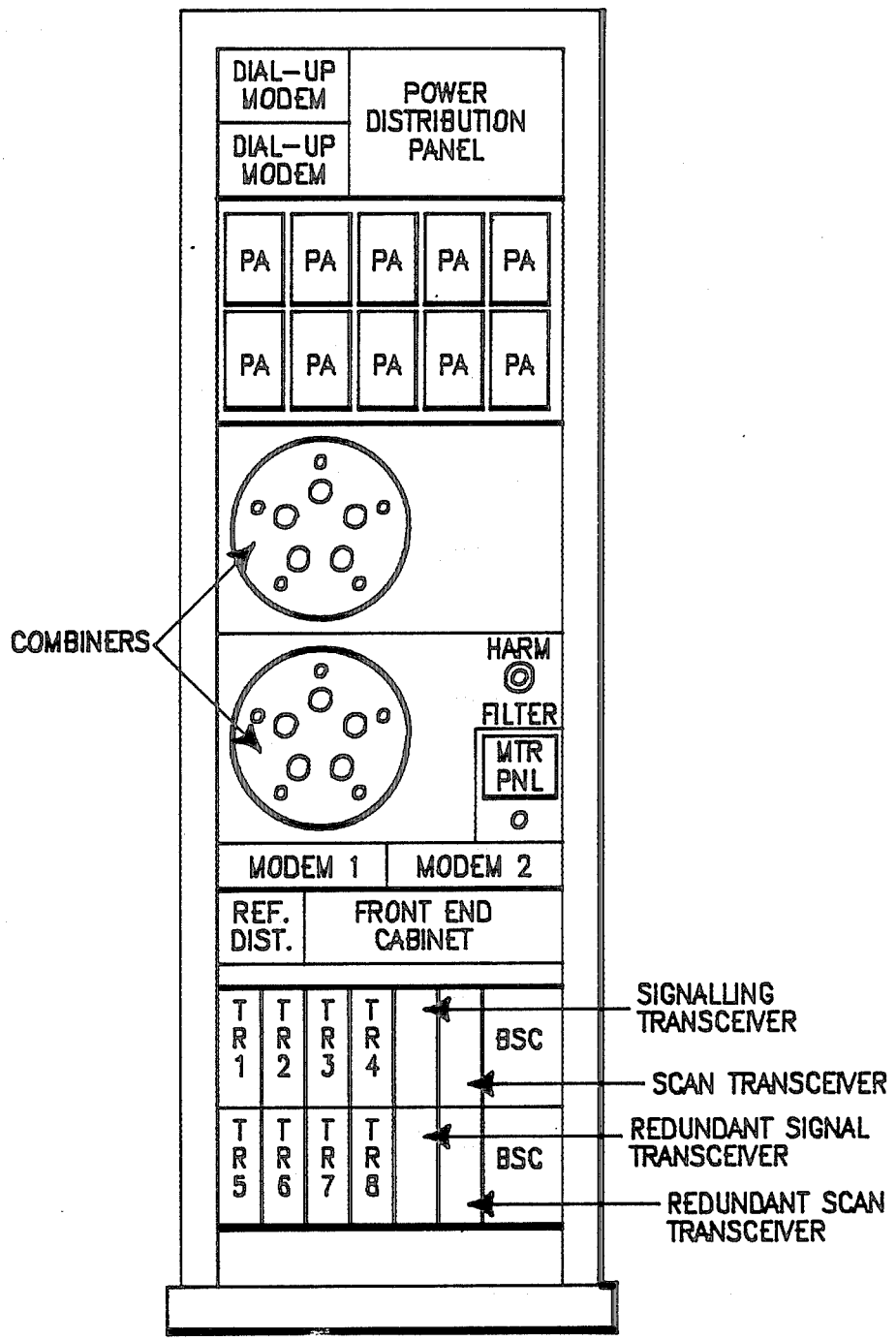
FIG. 19 is a representation of the common equipment housing which may be employed in the present invention to house and support the fixed site equipment.

The rack of equipment shown in FIG. 19 is the basic building block of the fixed site equipment in the preferred embodiment of the present invention. This rack can physically accommodate 12 transceivers and two BSCs. The normal configuration contains eight voice channel transceivers, two signalling transceivers (one of which is a redundant backup) and two scanning receivers (one of which may be a redundant backup). The specific function of each transceiver is determined by its physical location in the equipment rack and its connection to the BSC(s) through the backplane. Normally, there are two BSCs (one of which is a redundant backup) connected independently to each of the 12 transceiver slots. Provision is also made to physically accommodate 10 power amplifiers and two five-input transmit combiners (the scanning receivers do not require transmit capability). This configuration allows combining channels in basic groups of five. These groups of five transmitters can, in turn, be combined through a junction up to a maximum of twenty transmitters per antenna (depending upon the range of frequencies available).

The cost and complexity of the growth in the signalling and control subsystem is kept to a minimum by two means. First, the signalling data encoding and decoding hardware and software reside within a VCC and can be time shared by a multitude of transceivers. This time sharing is cost effective over the alternative of having the signalling hardware and software replicated in each transceiver. Second, the signalling and control hardware required for growth is concentrated within the VCC rather than being distributed among at least three control elements in previous designs.

In the preferred embodiment, each voice channel transceiver is given a slot in the hardware equipment housing as shown in FIG. 19. Transceiver slots 1 through 8 are reserved for voice channel transceivers exclusively. The bus and enable connections are hardwired between the electrical connector of the slot and the BSC (which may also make electrical connection via a connector) so that a transceiver placed in the slot is defined as a voice channel transceiver, although the particular characteristics (frequency of operation, for example) are not defined until programmed by the VCC. Those transceivers which are placed in the signalling transceiver and redundant signalling transceiver slots are also predefined as signalling transceivers and are permanently wired to a signalling transceiver controller function in the BSC. The scanning receiver slots, however, may be physically configured as either a scanning receiver or a voice channel transceiver by connecting either the scanning receiver communications bus or the voice channel transceiver communications bus (and enable line) to the slot connector. Thus, the proper electrical connections are made to the transceiver. Before the BSC is initialized, the voice channel/scanning receiver definition is programmed into the CSC memory. Upon initialization, the transceiver is given the proper operational configuration information as described previously.

In summary, then, a unique arrangement of fixed site equipment modules for a cellular radiotelephone system has been shown and described. With knowledge of the unique electrical characteristics of the physical slot in which a transceiver resides, a fixed site controller may program the unique operational parameters of each transceiver. One such operational parameter, the arrangement of diversity reception for either omnidirectional or sectorized cell configuration, can be selected by the controller to be consistent with a particular electrical characteristic of the electrical connection of a particular physical slot. Additionally, a fixed channel voice channel mode of operation or a signal strength detecting scan receiver mode of operation may also be programmed by the controller. Therefore, while a particular embodiment of the invention has been shown and described it should be understood that the invention is not limited thereto since modifications unrelated to the true spirit and scope of the invention may be made by those skilled in the art. It is therefore contemplated to cover the present invention and any and all such modifications by the claims of the present application.

We claim:

1. A modular multichannel fixed site station for radiotelephone communications, comprising:
   a common equipment housing having a plurality of apertures wherein electrical equipment modules may be disposed, each aperture having electrical connections to a fixed site station controller and providing an electrical interconnection having one of at least two characteristics with a module disposed therein;
   a plurality of radio transceiver modules, having variable receive and transmit parameters, removably disposed in first and second electrical interconnection characteristic apertures;
   means, disposed in said fixed site station controller, for programming said variable receive and transmit parameters of each said plurality of radio transceiver modules to predetermined parameters unique to each said transceiver module and dependent, inter alia, upon whether each transceiver module is disposed in said first or second electrical interconnection characteristic aperture.

2. A modular multichannel fixed site station in accordance with claim 1 wherein each of said plurality of radio transceiver modules further comprises first and second radio receivers, each radio receiver having an input and an output.

3. A modular multichannel fixed site station in accordance with claim 2 wherein each of said plurality of radio transceiver modules further comprises means for selecting the output of either said first receiver or said second receiver.

4. A modular multichannel fixed site station in accordance with claim 2 wherein each of said plurality of radio transceiver modules further comprises means, coupled to the input of said second receiver, for selecting one of at least two antennas.

5. A modular multichannel fixed site station in accordance with claim 1 wherein each of said plurality of radio transceiver modules further comprises a microcomputer.

6. A modular multichannel fixed site station in accordance with claim 5 wherein each of said radio transceiver modules further comprises means for detecting signal strength of a received signal.

7. A modular multichannel fixed site station in accordance with claim 6 wherein said microcomputer further comprises means, responsive to said means for programming, for processing a detected signal strength of a received signal.

8. A modular multichannel fixed site station in accordance with claim 5 wherein each of said radio transceiver modules further comprises means for detecting a supervisory audio tone signal.

9. A modular multichannel fixed site station in accordance with claim 8 wherein said microcomputer further comprises means, responsive to said means for programming, for determining the frequency of said supervisory audio tone signal.

10. A modular multichannel fixed site station in accordance with claim 5 wherein said means for programming further comprises means for communicating with said microcomputer via said electrical interconnection.

11. A cellular fixed site radio transceiver having variable receive and transmit parameters including diversity reception capability, variable frequency, and removably disposed in one of a plurality of apertures in a common equipment housing, each said aperture having an electrical connection to a fixed site controller and providing electrical interconnection having one of at least two characteristics with the fixed site radio transceiver, the fixed site radio transceiver comprising:
   means for receiving programming instructions from the fixed site controller via said electrical interconnection;
   means, responsive to said means for receiving programming instructions, for selecting an arrangement of diversity reception compatible with the characteristic of the aperture electrical interconnection;
   means, responsive to said means for receiving programming instructions, for programming a fixed channel mode of transceiver operation if the radio transceiver is disposed in an aperture having a first electrical interconnection characteristic; and
   means, responsive to said means for receiving programming instructions, for enabling operation of a signal strength detection mode of transceiver operation if the radio transceiver is disposed in an aperture having a second electrical interconnection characteristic.

12. A cellular fixed site radio transceiver in accordance with claim 11 wherein said means for selecting an arrangement of diversity reception further comprises first and second radio receivers, each radio receiver having an input and an output.

13. A cellular fixed site radio transceiver in accordance with claim 12 wherein said means for selecting an arrangement of diversity reception further comprises means for selecting the output of either said first receiver or said second receiver.

14. A cellular fixed site radio transceiver in accordance with claim 12 wherein said means for selecting an arrangement of diversity reception further comprises means, coupled to the input of said second receiver, for selecting one of at least two antennas.

15. A cellular fixed site radio transceiver in accordance with claim 11 further comprising means, responsive to said means for receiving programming instructions, for detecting a supervisory audio tone signal if the radio transceiver is disposed in an aperture having a second electrical interconnection characteristic.

16. A method of programming the functions of a cellular fixed site radio transceiver having variable receive and transmit parameters including diversity reception capability, variable frequency, and removably disposed in one of a plurality of apertures in a common equipment housing, each said aperture having an electrical connection to a fixed site controller and providing electrical interconnection having one of at least two electrical characteristics with the fixed site radio transceiver, the method comprising the steps of:
   receiving programming instructions from the fixed site controller via said electrical interconnection;
   selecting an arrangement of diversity reception compatible with the characteristic of the aperture electrical interconnection in response to said receiving of programming instructions;
   programming a fixed channel mode of transceiver operation if the radio transceiver is disposed in an aperture having a first electrical interconnection characteristic; and
   enabling operation of a signal strength detection mode of radio transceiver operation if the radio transceiver is disposed in an aperture having a second electrical interconnection characteristic.

17. A method in accordance with the method of claim 16 wherein said step of selecting an arrangement of diversity reception further comprises the step of selecting the output of either a first receiver or a second receiver.

18. A method in accordance with the method of claim 16 wherein said step of selecting an arrangement of diversity reception further comprises the step of selecting one of at least two antennas.

19. A method in accordance with the method of claim 16 further comprising the step of detecting a supervisory audio tone signal if said step of detecting the electrical characteristic indicates a second electrical characteristic.

* * * * *